Aug. 11, 1959 H. E. HOLLMANN 2,899,546

PASSIVE RADIO COMMUNICATION

Filed May 25, 1954 2 Sheets-Sheet 1

INVENTOR
HANS E. HOLLMANN
BY [signature]
ATTORNEY

INVENTOR
HANS E. HOLLMANN
BY
[signature]
ATTORNEY 2,899,546
Patented Aug. 11, 1959

2,899,546

PASSIVE RADIO COMMUNICATION

Hans E. Hollmann, Oxnard, Calif., assignor to Radio Patents Company, New York, N.Y., a partnership Application May 25, 1954, Serial No. 432,094

4 Claims. (Cl. 250—6)

The present invention relates to a method of and system for radio transmission, more particularly to semi-passive radio transmission systems, wherein only one end of a transmission link is powered while the opposite end requires no local power to operate. The invention has many applications in communication, remote control, telemetering, and the like, and is especially suited for use in mobile units, such as walkie-talkies for soldiers in combat action, mountain climbers, rescue boats, radio sondes, guided missiles, etc., which do not conveniently carry their own source of electrical power.

Semi-passive radio transmission systems have been proposed in the past but only with moderate success and for a limited operating range. According to the basic principle of semi-passive radio communication, a remote responder having no local power or active elements, such as vacuum tubes, transistors, etc. receives radio frequency energy from a master transmitter in the form of short wave pulses which, after being subjected to modulation by the responder, are retransmitted in the reverse direction back to the master station. There is used advantageously for this purpose a superregenerative transceiver serving to perform the double function of emitting spaced wave pulses as well as of detecting the returning modulated pulses upon reflection or retransmission by the distant responder. In order to separate the emitted or primary pulses from the returning echoes or secondary pulses, the remote responder includes suitable means to effect a time delay, such as by storing each incoming primary pulse over a short period of time and then retransmitting it in the reverse direction to the master station.

According to one prior art method, the necessary time delay is effected by providing the remote responder with a quality factor or Q in excess of the Q of the oscillatory or tank circuit of the superregenerator at the master station, whereby to spread the secondary pulses so as to exceed the width of the primary pulses. Since normally the responder has a relatively low Q, primarily as a result of its antenna damping, it can reasily be seen that the required Q-ratio can only be achieved by providing a local energy source, such as in the form of a Q-multiplier or the like, in which case, however, the responder would no longer be passive. An alternative method would be to reduce the Q of the transmitter which, in turn, would be at the expense of the sensitivity of the superregenerativ receiver.

Another known and more efficient system utilizes as a passive responder a resonant input or tank circuit coupled with a high Q piezoelectric crystal element both said circuit and crystal being in resonance with the carrier frequency of the received high frequency pulses. The storage and delay of the incoming pulses is effected by the production of coupling oscillations which serve to excite the superregenerator. A prerequisite for efficient coupling oscillations is a coupling below or above the critical coupling coefficient or a mismatch between the input (antenna) circuit and the crystal, whereby the crystal does not operate at its highest efficiency. All the known systems have further limitations and are difficult to operate satisfactorily and dependably.

A main object of the present invention is, therefore, the utilization of a new principle and the provision of a new system for storing and delaying the primary pulses in a passive responder effectively and dependably, to improve both the efficiency of operation and to increase the range of semi-passive radio communication to a hitherto unknown degree.

With the foregoing object in view, the present invention involves generally the provision of a passive responder in which the energizing incoming radio frequency (RF) pulses excite a piezoelectric crystal or resonator at a harmonic of its fundamental frequency. The crystal may resonate in overtones or harmonics of any of its vibrational modes, such as in the form of thickness, longitudinal, torsional, flexural vibrations, and the like or in combinations thereof, the harmonic vibrations, during each individual pulse excitation, building up until the ultrasonic energy stored in the crystal reaches an equilibrium. The stored energy at the end of each exciting pulse, is then caused to reverberate, thus providing the required storage and delay of the secondary and retransmitted pulses. This action of a piezoelectric resonator excited at a high harmonic of its fundamental mode of vibration is analogous to the reverberation of acoustical energy in a sound filled room.

Accordingly, another object of the invention is the impression of a radio frequency pulse to a piezoelectric medium, whereby, upon cessation of the exciting pulse, a multiplicity of pulses are propagated and caused to decay similar to the phenomena in a sound filled room.

Still another object is the utilization of a piezoelectric element which is sufficiently large so as to permit a great number of ultrasonic pulses to propagate throughout the entire crystal element and to reverberate in the form of multiple echoes by reflection at the outer walls or boundaries of the crystal.

A more specific object of the invention is the provision of a piezoelectric delay device for a passive responder whose electrodes are shaped and arranged in such a manner that the exciting ultrasonic waves originate in a limited region, and that after reflection from one or more of the outer walls, are returned at the same time to the excitation center, in such a manner that each excitation pulse is accompanied by a discrete or unitary delayed or echo pulse.

Still a further object of the invention is the provision of a delay crystal in the form of a rod or bar excited at one end, whereby to transmit and reflect the ultrasonic pulses from the opposite end along a well-defined path. In other words, the object is the provision of a new type of ultrasonic delay line for delaying the reradiated RF pulses in a pulse type passive responder, with one end of said line serving for the conversion of RF energy into ultrasonic energy by virtue of the direct piezoelectric effect and with the other end of the line being fully terminated so as to reflect the ultrasonic pulses which then return back to the first end to be reconverted into echo pulses by virtue of the inverse piezoelectric effect.

The invention, both as to its further objects and novel aspects, will be better understood from the following description taken in reference to the accompanying drawings forming part of this specification and wherein.

Like reference characters identify like parts throughout the different views of the drawings.

Figure 1:
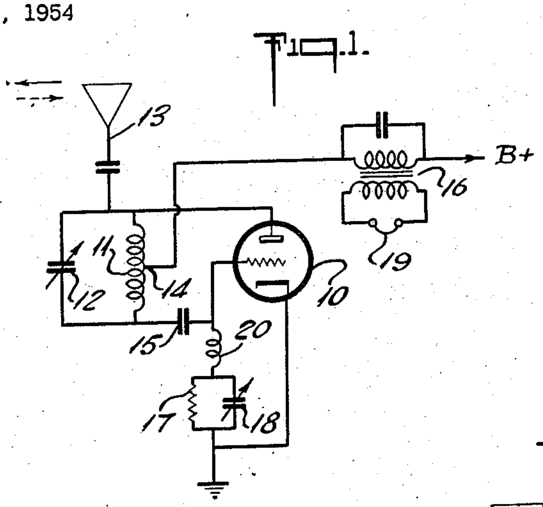
Fig. 1 is a circuit diagram of a simple superregenerative oscillator suitable for ue in connection with a passive responder according to the invention.

Referring to Fig. 1, there is shown a simple self-quenched superregenerative transceiver for transmitting primary or energizing RF wave pulses to a distant passive responder according to the invention and for receiving the reradiated echoes or secondary pulses upon modulation by a switch microphone, etc. embodied in the responder circuit. The transceiver shown comprises an oscillating triode 10 having a tank or oscillating circuit constituted by an inductance 11 in parallel with a variable condenser 12 and being connected between the plate and grid of the tube, in the manner of a well known Hartly type regenerative oscillator circuit commonly used for high frequencies, say about 50 megacycles and higher, and relying on the internal capacities of the tube for its operation. The RF oscillation pulses are radiated by an antenna 13 suitably coupled with the oscillator circuit 11—12, the B+ or high tension operating voltage for the tube being applied to the plate through a suitable tap point 14 on the inductance 11, in a manner well known and understood.

The grid coupling condenser 15 for the tank circuit serves to block the plate voltage from the grid of the tube, while the audio transformer 16 in the plate circuit serves to apply the demodulated signals such as speech, telegraphic signals or the like to a suitable translating or control device, such as a headphone 19, loudspeaker, recorder, etc.

Self-quenching of the oscillation is caused by the grid return network comprising a grid leak resistance 17 which is shunted by a grid condenser 18, the choke coil 20 serving to block the high frequency currents from the grid return circuit. More particularly, under the influence of RF oscillations, the current in the grid circuit produces a negative voltage across the condenser 18 with respect to ground. As soon as this negative voltage has built up to a sufficient value, the tube becomes blocked and the RF oscillations cut off or interrupted. The grid condenser 18 then discharges through the grid leak resistance 17 to a value sufficient to initiate a new oscillation period or pulse. In this manner "self-squegging" occurs in the form of relaxation oscillations having a period which, in a first order approximation is determined by the time constant $C_gR_g$, where $C_g$ is the capacity of the condenser 18 and $R_g$ is the resistance of the grid leak 17. Control of the superregeneration is effected by selecting the proper grid leak resistance 17 and varying the grid condenser 18. More particularly, if the time constant $C_gR_g$ approaches the RF period, the oscillator passes from squegging into a state of continuous oscillations with no self-quenching present. On the other hand, too large a time constant will cause a state of coherence in which each quench pulse builds up from the tail of the preceding pulse. Between these extremes there is a range for the product $C_gR_g$ within which the correct self-quenching takes place and the superregenerator becomes extremely sensitive to incoming signals. This optimum state of superregeneration is characterized by the well known hiss in the headphone 19 or loudspeaker connected in the output circuit of the tube in a manner well known.

In place of the relaxation type of self-quenching, any equivalent superregenerative circuit may be used for the purposes of the invention, such as a hybrid circuit in which the superregenerator acts as its own quench oscillator by the provision of a separate feedback circuit associated with the tube and operating at the quench frequency. Such a circuit is better controllable than the relaxation type self-quenching circuit. Alternatively, any known type of superregenerative transceiver using an independent or separate quench oscillator operated either in the linear or logarithmic mode may serve for the simultaneous transmission of primary energizing RF pulses and amplification and demodulation of the reradiated pulses or echoes, provided a proper adjustment and control of the pulse repetition frequency or quench period in relation to the delay time of the secondary pulses by the piezoelectric delay in the remote passive transponder.

Figure 2:
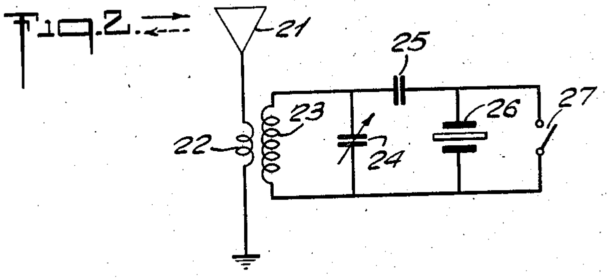
Fig. 2 is a diagram of a passive responder embodying a reverberating piezoelectric crystal according to the invention.

Referring now to Fig. 2, there is shown a circuit diagram of a passive responder according to the invention for cooperation with the master or energizing transmitter according to Fig. 1. The responder comprises simply an antenna 21, an antenna coupling coil 22 and a secondary or tank circuit comprised of an inductance coil 23 shunted by a variable tuning condenser 24. The tank circuit is loaded via a coupling condenser 25 by the piezoelectric (crystal) resonator 26. Moreover, a key 27 is shown which serves to short-circuit the crystal intermittently and thus to introduce intelligence to be retransmitted back to a distant master oscillator. Key 27 may be replaced by any type of modulator, for example a Q-modulator which, at the same time, acts as detector for the incoming signals.

Figure 4:
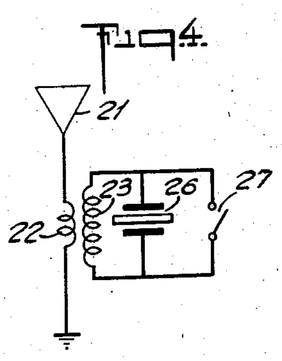
Figs. 3 and 4 illustrate modifications of responder circuits according to the invention.
Figure 3:
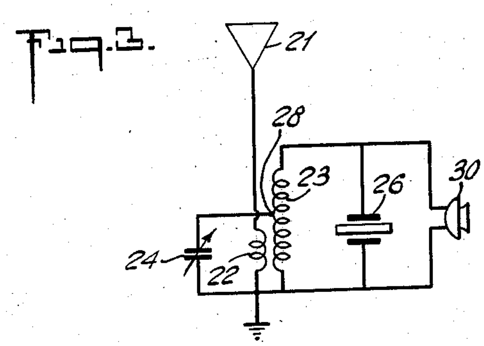

The crystal 26 may be in the form of a plate excited in thickness vibrations, a bar excited in lengthwise vibrations, a bender, a twister, or the like. According to the invention, the carrier frequency of the communication system and, in turn, the resonant frequency of the tank circuit 23—24 of the responder, correspond to an overtone or harmonic of the crystal's fundamental frequency, or in other words, the fundamental resonating frequency of the crystal is a submultiple of the carrier frequency of the incoming RF pulses received from the primary or master station. Depending on the size, shape, form, cut and electrode arrangement, the crystal exhibits a spectrum of distinct resonances with various quality factors corresponding to various vibrational modes and their overtones up to frequencies many times greater than that of the first maximum of the fundamental vibration. Optimum efficiency is obtained by matching the crystal and the tank circuit 23—24 by the coupling capacitor 25, in such a manner as to assure critical coupling and optimum excitation by the incoming RF pulses, as well as optimum reradiation of the echo pulses. At extremely high overtones, perfect matching may require a step-up transformer, such as in the form of an autotransformer by connecting the high frequency end of the tuning condenser 24 to a suitable tap point 28 on the inductance 23, as shown in Fig. 3, in which the key 27 of the preceding figures has also been replaced by a suitable microphone 30. On the other hand, the inherent capacity of the crystal may serve as the tank circuit condenser, in which case the crystal is matched directly to the antenna by means of the transformer 22—23, as shown in Fig. 4.

In a system of the type described, the passive transponder forms one end of a radio communication link whose opposite end consists of a suitable pulse transceiver, such as a superregenerator or a pulse radar system. The generated RF energy is transmitted in both directions, i.e. first from the powered transceiver to the passive transponder by means of the primary pulses which, after being received by the distant responder, are stored for a short interval of time and then reradiated as secondary signal pulses in the reverse direction. The storage of the incoming primary pulses is performed by the conversion of the electrical pulses across the electrodes of the crystal into ultrasonic pulses by virtue of the direct piezoelectric effect. The ultrasonic pulses then propagate throughout the entire crystal until they fill the crystal with ultrasonic energy. At the end of each primary pulse, this energy is dissipated partly by absorption in the crystal itself and partly by reconversion into electric pulses by virtue of the converse piezoelectric effect. The secondary or echo pulses are re-radiated by the responder after having been modulated to carry intelligence back to the master transceiver. Accordingly, with the RF pulses in mind, the passive responder may be visualized to be powered from the distant master transmitter without a conversion of any local energy into RF energy.

From the foregoing it will be understood that the basic principle of operation of the invention results from the ultrasonic reverberation in the crystal similar to the acoustical reverberation in a sound filled room. Thus, assuming that the duration of the primary pulses is long enough for a steady state of the ultrasonic energy within the crystal to have been reached, the ultrasonic reverberation follows the mechanism of acoustical reverberation leading to a reverberation characteristic of the type shown by Fig. 4. Provided the crystal, according to the invention, resonates or is excited at an overtone or harmonic of its fundamental frequency, the steady state will be characterized by numerous standing waves which, after the excitation stops, travel back and forth in various directions as do the sound waves in a reverberation chamber. From the physics of acoustical reverberation, it is well known that the sound energy, after cessation of the excitation, decays from a steady state $A_s$ along an exponential curve having superimposed thereon numerous irrigularities or echoes and during a reverberation time $T_R$, as shown by the dotted line in Fig. 5 wherein A represents the vibrational amplitude as a function of time $t$. The same phenomenon occurs in a reverberating crystal if the crystal is excited at a high overtone so that standing wave patterns are produced.

The analogy goes even so far that a reverberation time $T_R$ can be defined after which the vibration amplitude drops to a value $A_0$ being 60 db below the initial or steady state level $A_s$. This reverberation time should not be confused with the quality factor for the overtone in question which is a constant of the piezoelectric substance and does not depend on the dimensions of the crystal. In addition, a quality factor cannot explain the echoes which concentrate the energy in unitary pulses or echoes occurring at definite time intervals.

With the picture of the RF echoes in mind, the function of the telecrystal will be further understood from the following. RF pulses or wave trains are continuously radiated by the superregenerative transmitter at the rate of its quench frequency. After being delayed and reradiated from the remote responder, the pulses return in the form of multiple echoes after lapse of a definite echo time or delay. As is well known, the operation of a superregenerator is based on the synchronization of its generated oscillations by an incoming signal, said oscillations normally, i.e. without such a synchronization, originating in statistical disorder from the noise level and resulting in the well known hiss in the headphones connected in the output circuit of the oscillator. If the noise level is exceeded by incoming RF signal energy, the pulses build up from the RF level in perfect synchronism and the characteristic hiss disappears or becomes weaker. A perfect synchronism, however, does not require a continuous signal or energy distributed over the entire quench period, but weak momentary signal pulses are sufficient, provided they coincide with the beginning of each individual oscillation pulse. In other words, the superregenerator of a crystal responder controls itself by means of its own pulses which, after having traveled forth and back and having been delayed by the crystal, return to the superregenerator at the moment of its greatest sensitivity. In this way, it can easily be seen that the characteristic hiss disappears or at least diminishes as soon as there is perfect coordination between the superregenerative transmitter and its responder, more particularly as soon as the delay or echo time coincides with the quench period of the transmitted oscillation pulses. In other words, the superregenerator sees the passive responder as an effective continuous wave transmitter without realizing that each transmitted pulse synchronizes its succeeding pulse by the echo of the latter, rather than by a signal from a separate transmitter.

It can easily be seen that the tuning of a crystal responder of the prior art mentioned above and relying on the setting up of coupling oscillations to effect the necessary time delay is very critical because the echo time is not a constant but depends on the tuning of the responder's primary circuit as well as on the superregenerator's carrier and quench frequencies. The tuning of the entire system is a vicious circle. This critical tuning is eliminated by the provision of a fixed echo time, i.e. by dispensing with the coupling effect in favor of the piezoid's reverberation.

The simplest method for obtaining discrete or well-defined echoes is the excitation of the crystal at a high order harmonic of its fundamental frequency. In this case the crystal can no longer be described in terms of a single secondary circuit and the picture of coupling oscillations loses its meaning.

Figure 8:
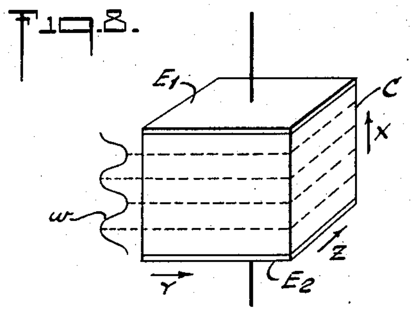
Figs. 8 and 9 are diagrams of a piezoelectric crystal explanatory of its function as a delay device according to the invention.
Figure 9:
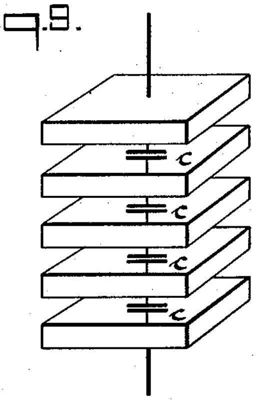
Figure 10:
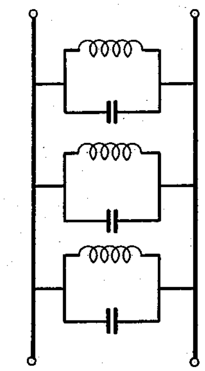
Fig. 10 illustrates the equivalent electric circuit to the piezoelectric delay device.

As is well known, the vibrations of a crystal of a given size and shape and extremely complicated. As the applied frequency is varied, a multiplicity of resonance effects occur, depending on the various modes that are excited by the electric field in any given direction. In order to obtain a fundamental insight, let us assume that the rectangular crystal C, having electrode $E_1$ and $E_2$ as shown in Fig. 8, vibrates at the fifth harmonic of its fundamental thickness vibration without other vibrational modes and harmonics being present. Under this assumption, the crystal may be visualized to be cut into five thinner crystals or slabs, as indicated by dotted lines, each vibrating at the same fundamental frequency, i.e. a frequency equal to five times the fundamental frequency of the crystal, in the example illustrated and indicated by the sine wave $w$ in the drawing. If the vibrational coupling is substituted by electrical coupling elements, such as a number of coupling condensers $c$, there is obtained an equivalent ladder structure as shown in Fig. 9. Without further comments, this electromechanic cascade can be simulated by the equivalent electric filter or ladder network as shown by Fig. 10. With an increasing order of harmonics, the number of the individual sections increases and the cascade asymptotically assumes the form of a transmission line. Since there is no output, the transmission line represents a 2-pole circuit terminated by an open end.

A conventional piezoelectric resonator usually has the form of a flat plate whose width and length is much greater than its thickness. When the ultrasonic excitation of such a plate ceases, the standing vibrational waves do not dissipate solely in the X-direction but likewise in the direction of the Y and Z axis. Instead, therefore, of simulating the piezoid in the form of multiple ladder structures with a large number of crosswise couplings, it is more convenient to compare the crystal with a reverberating room or cavity. As is well known, if a sound-hard room, such as a reverberation chamber, is charged with sound energy and if the excitation is discontinued, the energy surges to and fro in all directions and decays in the form of Sabine's *e*-function superimposed by irregular echoes. Depending on the direction of the excitation, there are certain frequencies which determine a pronounced path of the decaying sound waves and thus produce well pronounced echoes.

Figure 6:
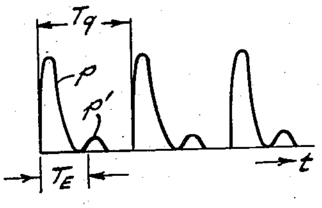
Figs. 6 and 7 are diagrams illustrating the relation between the excitation and reverberating pulses in a piezoelectric delay device of a passive responder according to the invention.
Figure 7:
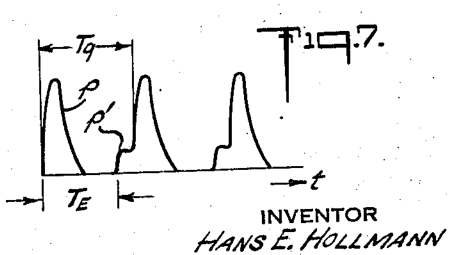

The analogy between the ultrasonic reverberation in the crystal responder and a reverberating sound chamber have been confirmed by oscillograms of RF signal pulses induced in a responder after rectification by a crystal diode so that only the envelopes appear on the screen of the oscillograph. The oscillograms clearly show the effect of reverberation in the crystal at a carrier frequency which slightly deviates from the crystal's resonance. In accordance with the picture of a reverberating room, the reverberation curve includes a multiplicity of echoes superimposed upon the average decay of the ultrasonic energy. A more accurate tuning results in a single echo accompanying each pulse after lapse of the echo time $T_E$, as shown by Fig. 6. Under this particular condition of operation, the reaction of the reradiated echo pulses upon the superregenerator is very weak which manifests itself in a negligible reduction of the superregenerator's hiss. Finally optimum tuning results in a completely disappearing hiss and a discrete echo pulse similar to the oscillogram as shown in Fig. 7 and with the quech period $T_q$ coinciding with the echo time $T_g$. Under these well defined operating conditions, the superregenerator is brought into the coherent state of operation.

In order to define the requirements for an efficient operation of the responder the superregenerative transceiver will be considered further. Fig. 6 shows the envelope of the emitted pulses *p* separated by intervals equal to the quench period $T_q$. After being received by the remote responder, the crystal produces echo pulses in the manner described and reradiates them back to the superregenerator, where they follow each individual quench pulse. In the example shown in Fig. 6, all the reverberating energy is concentrated in a single echo pulse *p'* following each primary pulse *p* after lapse of the echo time $T_E$. The superregenerator exhibits its highest efficiency and sensitivity if the echo pulses coincide with the beginning of each quench pulse, in that the echoes synchronize the RF oscillations and thus bring the superregenerator into the coherent state of operation. The optimum efficiency, therefore, can easily be seen to occur if the echo time $T_E$ equals the quench period $T_q$ as illustrated in Fig. 7.

Figure 5:
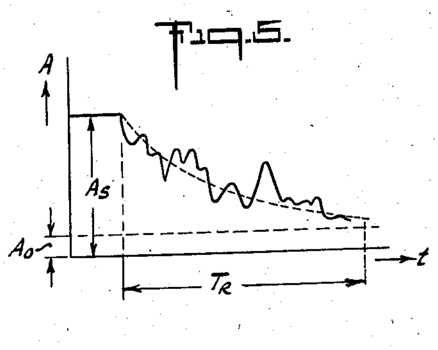
Fig. 5 shows a reverberation characteristic explanatory of the function of the invention.
Figures 11, 13, 15:
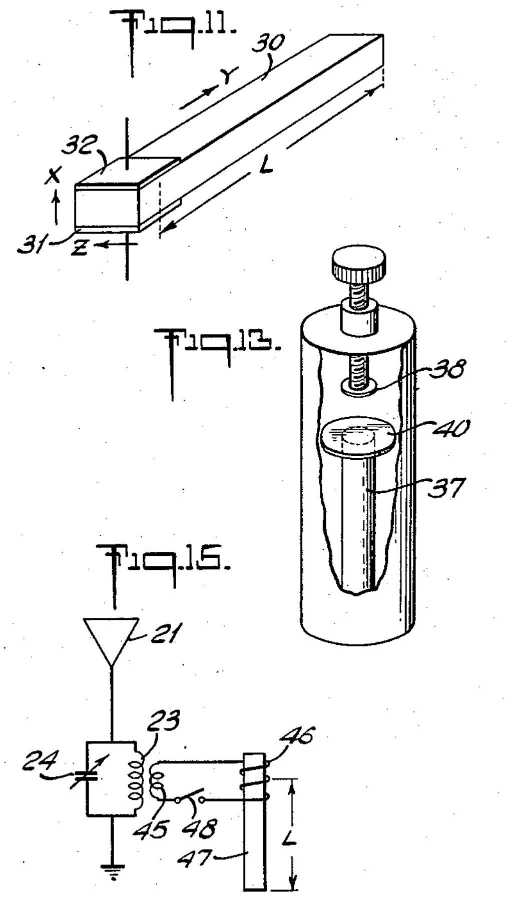
Fig. 11 shows a preferred construction of a reverberating crystal or delay line according to the invention.
Fig. 13 shows the arrangement of a reverberating piezoelectric element mounted between the plates of the adjustable condenser of a cavity resonator.
Fig. 15 shows a further modification of a passive responder according to the invention utilizing a magnetoconstrictive element as a supersonic reveration or delay device.

If there is a multiplicity of echoes, as in the case of a reverberation characteristic according to Fig. 5, the quench frequency will exhibit multiple resonances which occur every time the quench period equals one of the various echo times. Since the superregenerator requires the echo amplitudes to exceed the inherent noise, maximum efficiency for the reverse communication will be obtained by concentrating the echo energy into a single echo to avoid any multiple resonance. For this purpose, it is advisable to replace the reverberating crystal by a piezo-electric or ultrasonic delay line as shown in Fig. 11 replacing the crystal in the previously shown arrangements.

The ultrasonic delay line, according to the invention, differs from a conventional piezoelectric resonator in that the electrodes cover only a limited portion of the crystal to effect a localized excitation of the crystal. Thus, the crystal 30 in Fig. 11 has the form of a rectangular bar 30 in X-cut with only one end being provided with two electrodes 31 and 32. Under the influence of an RF voltage impressed upon the electrodes, the crystal resonates in thickness vibrations primarily only in the interspace between the electrodes. By mechanical coupling effects, however, the vibrations spread in the Y-direction until they reach the free end of the bar where they are reflected.

They then travel back until they again enter the electric field between the electrodes and, by virtue of the converse piezoelectric effect, produce an RF voltage between the electrodes 31 and 32. Consequently, the piezoelectric bar operates equivalent to a conventional ultrasonic delay line except that no separate emitters and converters are utilized but that the energy conversion from electrical signals into ultrasonic signals and vice versa takes place exclusively by virtue of the direct and converse piezoelectric effects.

If $v_y$ is the longitudinal velocity of sound in the piezoelectric substance, e.g. quartz, the echo time $T_E$ in a first order approximation, is determined by the formula $T_E=L/v_y$ where L denotes the effective length of the bar. It must be pointed out, however, that this simple formula can only be utilized as a guide, because the effective sound velocity $v_y$ is a rather complex function of the exciting frequency as well as of the shape and dimensions of the vibrating element. Multiple reflections between both ends do not enter the picture because the input end of the crystal is matched to the tank circuit of the responder and spurious reflections are suppressed thereby.

Figure 12:
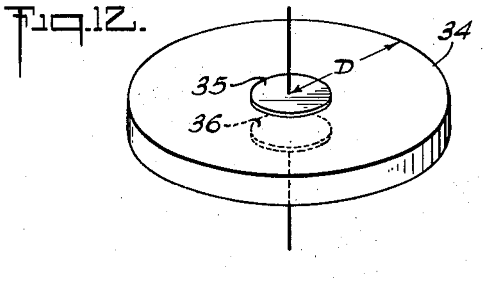
Fig. 12 is a modification of a reverberating piezoelectric element for use in connection with the invention.

Instead of using a unilateral delay line in the form of a bar with unsymmetrically arranged electrodes, the reverberating element may also have a circular shape. Fig. 12 shows such a three-dimensional delay line whose crystal has the form of a disc 34 provided with small central electrodes 35 and 36. In the same way as before, the ultrasonic vibrations propagate in all directions along the radii D and, after reflection from the open periphery, return to the center portion, where they are reconverted into RF pulses across the electrodes. Referring to the analogy with a reverberating room, the ultrasonic delay lines shown in Figs. 11 and 12 may be compared with a long and narrow or cylindrical echo chamber.

The arrangement of the reverberating crystal in the passive responder offers a great variety of possibilities, some significant examples of which are given in the following. Instead of connecting an extra crystal to the tank circuit, as shown in Figs. 2 to 4, the crystal may be cemented directly to the plate of the tuning condenser. Furthermore, the tank circuit may be in the form of a cavity resonator of conventional type as shown in Fig. 13, whose tuning condenser is constituted by the open end of a coaxial center rod 37 and the adjustable counter-electrode 38. In this case the reverberating crystal 40, preferably in the form of a circular slab or disc, is merely cemented on top of the free end of the coaxial conductor 37. Again, if the cavity is excited by an incoming RF pulse, supersonic energy will be stored in the crystal by the oscillating field between the electrodes 37 and 38. Upon cessation of the exciting pulse, the crystal will be caused to reverberate in the manner described to result in a secondary excitation of the cavity by virtue of the inverse piezoelectric effect, in a manner readily understood from the above.

Figure 14:
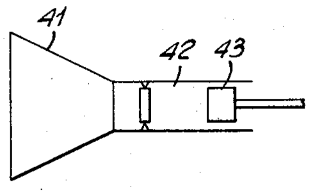
Fig. 14 illustrates a reverberating piezo crystal according to the invention mounted in the wave guide of a micro-wave receiver.

At very high frequencies, such as those used in the field of radar, the reverberating crystal may be properly suspended in a wave guide forming part of the responder. An example of this type is illustrated in Fig. 14 wherein the microwave responder comprises a conventional horn antenna 41, a wave guide 42 and a tuning piston 43 arranged in the order mentioned and readily understood. The reverberating crystal 44 is suitably mounted in the wave guide 42 at a proper distance from the horn 41, in such a manner that the E-waves excite the crystal at a harmonic which then is caused to reverberate and to reradiate the echo pulses, in a manner readily understood from the foregoing.

While a piezoelectric reverberator or delay device is used in the examples described, it will be understood that equivalent electromechanical vibratory devices capable of converting electric variations into mechanical vibrations and vice versa, can be employed with equal advantage for the purpose of the invention. Thus, referring to Fig. 15, there is shown a passive responder utilizing a magnetoconstrictive elements as a supersonic reverberator replacing the piezoelectric element in the previous figures. The received RF pulses set up in the input circuit 24—23 are impressed via a coupling coil 45 upon the exciting winding 46 or a rod-shaped magnetostrictive element such as a ferrite bar or the like.

Again, as a result of the exciting magnetic field a supersonic compressional wave pulse produced locally within the space enclosed by the coil 46 is caused to travel along the length L of the rod to be reflected and reapplied by the inverse magnetostrictive effect upon the antenna for reradiation to the remote station such as a superregenerative transceiver. By the proper design of the magnetostrictive element, i.e. the length L of the rod 47 in the example shown, it is possible to provide a definite and fixed delay of the secondary or passive pulses suitable to excite the superregenerator at the instant of its highest efficiency or sensitivity to incoming radio signals, in a manner similar to and readily understood from the foregoing. The passive signal pulses may again be modulated, such as by the provision of a key 48 in series with the exciting coil 46, a microphone or any other suitable control or modulating device.

There is thus provided by the invention a pulse type passive responder wherein the time delay of the re-transmitted or secondary high frequency pulses serving to transmit the passive signal or message to a cooperating master station is produced by the reverberation effect with an electromechanical vibratory element, for example a piezoelectric crystal, excited by the incoming or primary wave pulses received from said master station at a high vibrational mode in respect to the pulse carrier frequency. By the proper design of said element, the delay time has a fixed and optimum value, to result both in a concentration of the reverberating energy into single secondary pulses following the primary pulses at a predetermined spacing interval. This, among other advantages, results in optimum sensitivity in a receiver associated with the master station, for example, a superregenerative receiver commonly used in semi-passive communication of the type according to the invention.

More specifically, in the case of transverse vibrations, as shown in Fig. 8, the crystal is excited in a high order harmonic of its fundamental vibrating frequency to result in a desired reverberation effect upon cessation of the exciting or primary pulses. On the other hand, in the case of a delay line, as shown in Fig. 11, the crystal may be excited at its fundamental frequency, the concept of harmonic or high mode vibration in this case applying to the longitudinal or shear vibrations along the crystal rod.

In the foregoing the invention has been described with reference to a few specific devices. It will be evident, however, that variations and modifications, as well as the substitution of equivalent elements for those shown, may be made without departing from the broad scope and spirit of the invention as defined by the appended claims. The specification and drawings are accordingly to be regarded in an illustrative rather than in a limiting sense.

I claim:

1. A radio signaling system comprising a transmitter radiating a series of primary carrier frequency electric wave pulses having a predetermined pulse recurrence frequency, a passive responder remote from said transmitter comprising antenna means, a piezoelectric crystal element and a pair of coupling electrodes disposed at one end of said element coupling the same with said antenna means, to cause the received wave pulses to be converted into ultrasonic wave pulses being propagated through and reflected by the opposite end of said crystal element, to effect a predetermined time delay of the reflected wave pulses upon reconversion through said coupling electrodes into electric pulses in said antenna means, thereby to cause secondary electric wave pulses to be reradiated by said antenna means during the spacing intervals of and in substantially fixed time-separated relation to said primary wave pulses, means to modulate said secondary wave pulses prior to reradiation in accordance with a signal to be transmitted by said responder, and means associated with said transmitter to receive and demodulate said secondary wave pulses independently of said primary pulses.

2. A radio signaling system comprising a transmitter radiating a series of primary carrier frequency electric wave pulses having a predetermined pulse recurrence frequency, a passive responder remote from said transmitter comprising antenna means, a magnetostrictive element having an exciting winding at one end coupling the same with said antenna means, to cause the received wave pulses to be converted into ultrasonic wave pulses being propagated through and reflected by the opposite end of said element, to effect a predetermined time delay of the reflected pulses upon reconversion through said exciting winding into electric wave pulses in said antenna means, thereby to cause secondary electric wave pulses to be reradiated by said antenna means during the spacing intervals of and in substantially fixed time-separated relation to said primary wave pulses, means to modulate said secondary wave pulses prior to reradiation in accordance with a signal to be transmitted by said responder, and means associated with said transmitter to receive and demoduate said secondary wave pulses independently of said primary pulses.

3. A radio signaling system comprising a superregenerative transceiver radiating a series of primary carrier frequency electric wave pulses having a predetermined pulse recurrence frequency, a passive responder remote from said transceiver comprising antenna means, a piezoelectric crystal element and a pair of coupling electrodes disposed at one end of said element connecting the same with said antenna means, to cause the received electric wave pulses to be converted into ultrasonic wave pulses being propagated through and reflected from the opposite end of said element, to effect a predetermined time delay of the reflected pulses upon reconversion through said coupling electrodes into electric pulses in said antenna means, thereby to cause concentrated secondary electric wave pulses to be reradiated by said antenna means during the spacing intervals of and in substantially fixed time-separated relation to said primary wave pulses, said crystal having a delay time to cause the secondary pulses to substantially coincide with the periods of maximum response sensitivity of said transceiver to incoming radio signals, means to moduate said secondary wave pulses prior to reradiation in accordance with a signal to be transmitted by said responder, and means to derive a demodulated output signal from said transceiver.

4. A radio signalling system comprising a transmitter radiating a series of primary carrier frequency electric wave pulses having a predetermined pulse recurrence frequency, a passive responder remote from said transmitter comprising antenna means, an electro-mechanical vibratory element having electrical coupling means disposed at one end thereof and connected to said antenna means, to cause the received wave pulses to be converted into ultrasonic pulses being propagated through and reflected from the opposite end of said element, to effect a predetermined time delay of the reflected wave pulses upon reconversion through said coupling means into electric pulses in said antenna means, thereby to cause secondary electric wave pulses to be reradiated by said antenna means during the spacing intervals between and in substantially fixed time-separated relation to said primary wave pulses, and means associated with said transmitter to receive and demodulate said secondary wave pulses independently of said primary pulses.

References Cited in the file of this patent

UNITED STATES PATENTS

| | | |
|---|---|---|
| 2,461,646 | Lewis | Feb. 15, 1949 |
| 2,510,299 | Schramm | June 6, 1950 |
| 2,511,409 | Mayberry | June 13, 1950 |
| 2,539,476 | Rines | Jan. 30, 1951 |
| 2,749,436 | Rines et al. | June 5, 1956 |
| 2,812,427 | Magondeaux | Nov. 5, 1957 |

FOREIGN PATENTS

| | | |
|---|---|---|
| 513,857 | Belgium | Sept. 15, 1952 |